(12) United States Patent
Kikuzuki (10) Patent No.: US 10,999,785 B2
(45) Date of Patent: May 4, 2021

(54) INFORMATION PROCESSING APPARATUS, ARRANGEMENT COMPUTING METHOD FOR WIRELESS ACCESS POINTS, AND STORAGE MEDIUM

(71) Applicant: FUJITSU LIMITED, Kawasaki (JP)

(72) Inventor: Tatsuya Kikuzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 10 days.

(21) Appl. No.: 16/672,144

(22) Filed: Nov. 1, 2019

(65) Prior Publication Data

US 2020/0178163 A1 Jun. 4, 2020

(30) Foreign Application Priority Data

Nov. 29, 2018 (JP) ............... JP2018-224180

(51) Int. Cl.
*H04W 48/16* (2009.01)
*H04W 48/20* (2009.01)
*H04W 48/08* (2009.01)
*H04W 88/06* (2009.01)
*H04W 88/08* (2009.01)
*H04W 16/18* (2009.01)

(52) U.S. Cl.
CPC .......... *H04W 48/16* (2013.01); *H04W 16/18* (2013.01); *H04W 48/08* (2013.01); *H04W 48/20* (2013.01); *H04W 88/06* (2013.01); *H04W 88/08* (2013.01)

(58) Field of Classification Search
CPC ..... H04W 16/18; H04W 24/02; H04W 16/20; H04W 16/22; H04W 48/20; H04L 41/0806; H04L 41/0823; H04L 41/12; H04L 41/145
See application file for complete search history.

(56) References Cited

U.S. PATENT DOCUMENTS

| 2004/0127224 A1* | 7/2004 | Furukawa | H04W 16/18 455/446 |
| 2010/0150061 A1* | 6/2010 | Cho | H04W 16/20 370/328 |
| 2015/0009857 A1* | 1/2015 | Rath | H04L 41/145 370/254 |

FOREIGN PATENT DOCUMENTS

| JP | 2000-333239 A | 11/2000 | |
| JP | 2003274444 A * | 9/2003 | ......... H04W 16/18 |
| JP | 2007-235831 A | 9/2007 | |
| JP | 2016-115956 A | 6/2016 | |

* cited by examiner

*Primary Examiner* — Nam T Huynh
(74) *Attorney, Agent, or Firm* — Arent Fox LLP (57) ABSTRACT

An information processing apparatus includes a memory, circuitry coupled to the memory, the circuitry configured to determine whether or not a binary search method is used by using a predetermined reference to determine the number of wireless access points, and search for a minimum number of access points satisfying communication requirements in a binary search loop in a case where it is determined that the binary search method is used and search for the minimum number of access points satisfying the communication requirements by decreasing the number of access points by a predetermined number of units at a time in a case where it is not determined that the binary search method is used to search for an arrangement of the wireless access points with respect to the searched minimum number of access points.

13 Claims, 8 Drawing Sheets

| DECREASE AP COUNT [UNIT] | VALUE @1 | VALUE @2 |
|---|---|---|
| 1 | NG | NG |
| 2 | NG | NG |
| 3 | NG | NG |
| 4 | NG | NG |
| 5 | NG | NG |
| 6 | NG | NG |
| 7 | NG | NG |
| 8 | NG | NG |
| 9 | NG | NG |
| 10 | NG | OK |
| 11 | NG | OK |
| 12 | OK | OK |
| 13 | OK | OK |
| 14 | OK | OK |
| 15 | OK | OK |
| 16 | OK | OK |

① DETERMINE IN MANNER OF BINARY SEARCH

② DETERMINE BY DELETING ONE UNIT AT A TIME FROM NUMBER OF AP UNITS = 12

⟶ : ORDER OF CALCULATION

FIG. 8

INFORMATION PROCESSING APPARATUS, ARRANGEMENT COMPUTING METHOD FOR WIRELESS ACCESS POINTS, AND STORAGE MEDIUM

CROSS-REFERENCE TO RELATED APPLICATION

This application is based upon and claims the benefit of priority of the prior Japanese Patent Application No. 2018-224180, filed on Nov. 29, 2018, the entire contents of which are incorporated herein by reference.

FIELD

The embodiment discussed herein is related to an information processing apparatus, an arrangement computing method for wireless access points, and a storage medium.

BACKGROUND

It is desirable that wireless access points may be automatically computed so as to satisfy communication requirements of users. In view of the above, a technology for automatically computing the wireless access points has been disclosed.

For example, as related art, Japanese Laid-open Patent Publication Nos. 2000-333239, 2016-115956, and 2007-235831, and the like are disclosed.

In order that the wireless access points are automatically computed, when an arrangement of requisite minimum access points is to be searched for while the number of access points is decreased, there is a fear that computing time becomes very long. On the other hand, when the requisite minimum access points are to be searched for by using a binary search method, there is a fear that a highly accurate arrangement is not obtained.

In view of the above-mentioned circumstances, it is desirable to provide an information processing apparatus that may efficiently obtain an arrangement of requisite minimum access points, an arrangement computing method for wireless access points, and an arrangement computing program for the wireless access points.

SUMMARY

According to an aspect of the embodiments, an apparatus includes an information processing apparatus includes a memory, circuitry coupled to the memory, the circuitry configured to determine whether or not a binary search method is used by using a predetermined reference to determine the number of wireless access points, and search for a minimum number of access points satisfying communication requirements in a binary search loop in a case where it is determined that the binary search method is used and search for the minimum number of access points satisfying the communication requirements by decreasing the number of access points by a predetermined number of units at a time in a case where it is not determined that the binary search method is used to search for an arrangement of the wireless access points with respect to the searched minimum number of access points.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

An arrangement of wireless access points will be described before descriptions on an embodiment.

To arrange the wireless access points so as to satisfy communication requirements of users, expertise in a wireless technology is demanded. When this arrangement of the access points may be obtained by automatic computation, even a nonspecialist in the wireless technology may perform the arrangement of the access points. For example, in the automatic computation of the arrangement of the access points, the number of minimum access points that satisfy communication requirements such as coverage rate, capacity corresponding to the number of devices that may be accommodated, throughput, and communication delay (the number of requisite minimum access points) and an arrangement thereof are to be obtained.

For example, a breadcrumb method may be used. The breadcrumb method is a technique for sequentially arranging access points such that the coverage rate satisfies a predetermined condition. However, according to this technique, it is difficult to take into account the communication requirements such as the capacity and the throughput.

In view of the above, a technique for searching for an arrangement that satisfies the respective communication requirements may be used. According to this technique, the number of access points is fixed at an initial value, and an optimal arrangement that satisfies the respective communication requirements is searched for. When the optimal arrangement that satisfies the respective communication requirements is searched for, a similar search is performed by using an arrangement obtained by decreasing the number of access points by a predetermined number of units (for example, 1) from the optimal arrangement as an initial arrangement. When the number of access points is decreased until the respective communication requirements are not satisfied, it is possible to obtain the minimum number of access points and the optical arrangement thereof. In this specification, this technique will be referred to as a decrement search. In the decrement search, an asymptotic accuracy is increased in a case where the next search is performed while the number of access points is decreased by the predetermined number of units at a time. However, in the decrement search, since a calculation order (the maximum number of searches) becomes N times, when the initial value is too high, there is a fear that the computing time becomes very long.

In view of the above, use of a binary search is considerable as the technique for searching for the arrangement that satisfies the respective communication requirements. In the binary search, the optimal arrangement that satisfies the respective communication requirements is searched for with respect to a value corresponding to a half of the maximum number of access points, and when the arrangement that satisfies the respective communication requirements is searched for, a similar search is performed by using an arrangement obtained by decreasing the number of access points by half from the optimal arrangement as the initial arrangement. When the number of access points is decreased until the respective communication requirements are not satisfied, it is possible to obtain the minimum number of access points and the optical arrangement thereof. In the binary search, since the calculation order (the maximum number of searches) is only $\log_2 N$ times, the computing time may be shortened. However, since the next search is performed while the number of access points is decreased by half, the asymptotic accuracy is decreased in a case where the next search is performed.

From the above, as illustrated in Table 1, the binary search and the decrement search have a trade-off relationship.

TABLE 1

| SEARCH METHOD | THE NUMBER OF COMPUTATIONS | ASYMPTOTIC ACCURACY TO OPTIMAL ARRANGEMENT |
| --- | --- | --- |
| BINARY SEARCH | FEW | INTERMEDIATE |
| DECREMENT SEARCH | MANY | VERY HIGH |

In view of the above, according to the following embodiment, an information processing apparatus that may efficiently obtain an arrangement of wireless access points, an arrangement computing method for the wireless access points, and an arrangement computing program for the wireless access points will be described.

First Embodiment

Figure 1A:
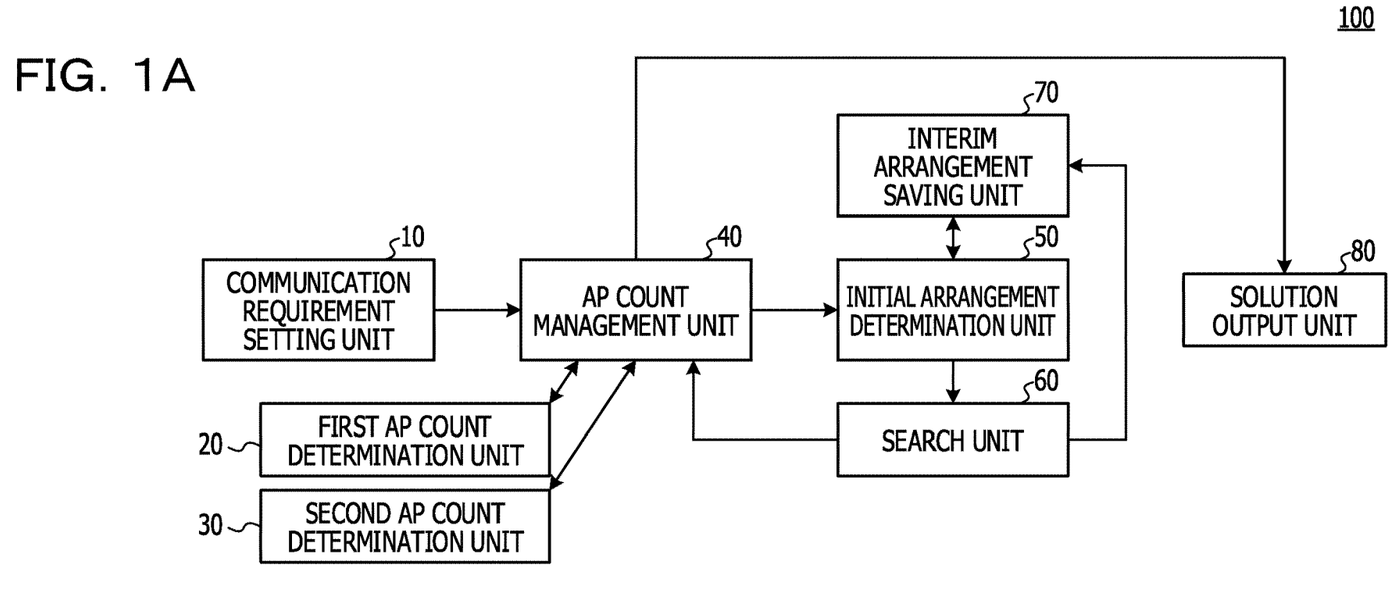
FIG. 1A is a block diagram exemplifying an overall configuration of an information processing apparatus according to a first embodiment.

FIG. 1A is a block diagram exemplifying an overall configuration of an information processing apparatus 100 according to a first embodiment. As exemplified in FIG. 1A, the information processing apparatus 100 includes a communication requirement setting unit 10, a first AP count determination unit 20, a second AP count determination unit 30, an AP count management unit 40, an initial arrangement determination unit 50, a search unit 60, an interim arrangement saving unit 70, a solution output unit 80, and the like.

Figure 1B:
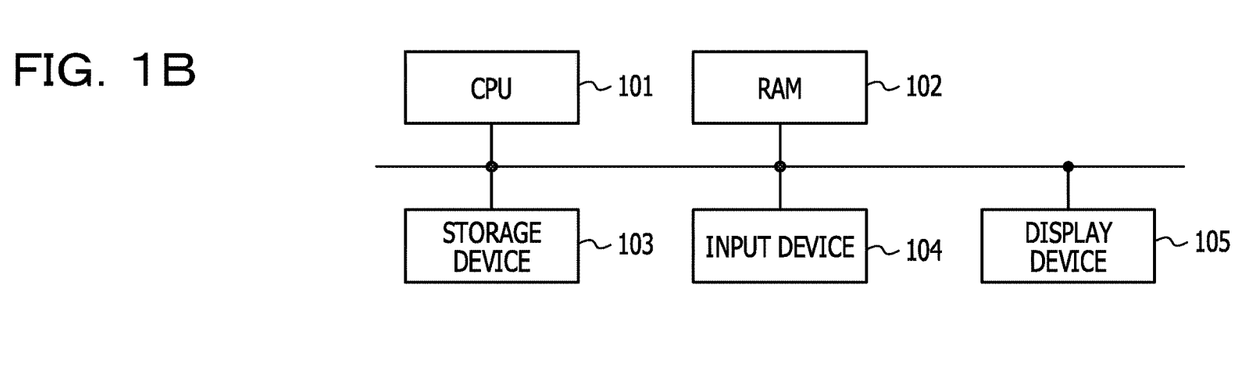
FIG. 1B is a block diagram for describing a hardware configuration of the information processing apparatus according to the first embodiment.

FIG. 1B is a block diagram for describing a hardware configuration of the information processing apparatus 100. As exemplified in FIG. 1B, the information processing apparatus 100 includes a central processing unit (CPU) 101, a random-access memory (RAM) 102, a storage device 103, an input device 104, a display device 105, and the like. The respective devices are coupled to each other via a bus or the like. The CPU 101 is a central processing unit. The CPU 101 includes one or more cores. The RAM 102 is a volatile memory that temporarily stores a program to be executed by the CPU 101, data to be processed by the CPU 101, and the like. The storage device 103 is a nonvolatile storage device. As the storage device 103, a read-only memory (ROM), a solid state drive (SSD) such as a flash memory, a hard disk to be driven by a hard disk drive, or the like may be used, for example. The input device 104 is a device for a user to input information and is a keyboard, a mouse, or the like. The display device 105 is a device that displays a computation result of the information processing apparatus 100 or the like and is a liquid crystal display or the like. When an arrangement computing program for the wireless access points which is stored in the storage device 103 is executed by the CPU 101, the communication requirement setting unit 10, the first AP count determination unit 20, the second AP count determination unit 30, the AP count management unit 40, the initial arrangement determination unit 50, the search unit 60, the interim arrangement saving unit 70, the solution output unit 80, and the like are realized. The communication requirement setting unit 10, the first AP count determination unit 20, the second AP count determination unit 30, the AP count management unit 40, the initial arrangement determination unit 50, the search unit 60, the interim arrangement saving unit 70, the solution output unit 80, and the like may be respectively constituted by dedicated-use circuits and the like.

The communication requirement setting unit 10 sets the communication requirements such as the coverage rate, the capacity, the throughput, and the communication delay which are input by the user using the input device 104. The first AP count determination unit 20 determines the number of access points (hereinafter, an AP count) in a case where the binary search is performed. The second AP count determination unit 30 determines the AP count in a case where the decrement search is performed. The AP count management unit 40 manages the AP count in a case where the search unit 60 performs the search. The AP count management unit 40 also determines whether the binary search is performed or the decrement search is performed by using a predetermined reference.

The initial arrangement determination unit 50 determines an initial arrangement in a subroutine in a case where the binary search or the decrement search is performed. The search unit 60 performs computation in the subroutine in a case where the binary search or the decrement search is performed based on the initial arrangement determined by the initial arrangement determination unit 50 and the AP count managed by the AP count management unit 40. The interim arrangement saving unit 70 saves an optimal arrangement searched for by the search unit 60 for each subroutine as an interim arrangement. The solution output unit 80 outputs the latest arrangement obtained as the result of the search by the search unit 60 as a solution. The solution output by the solution output unit 80 is displayed by the display device 105.

Figure 2:
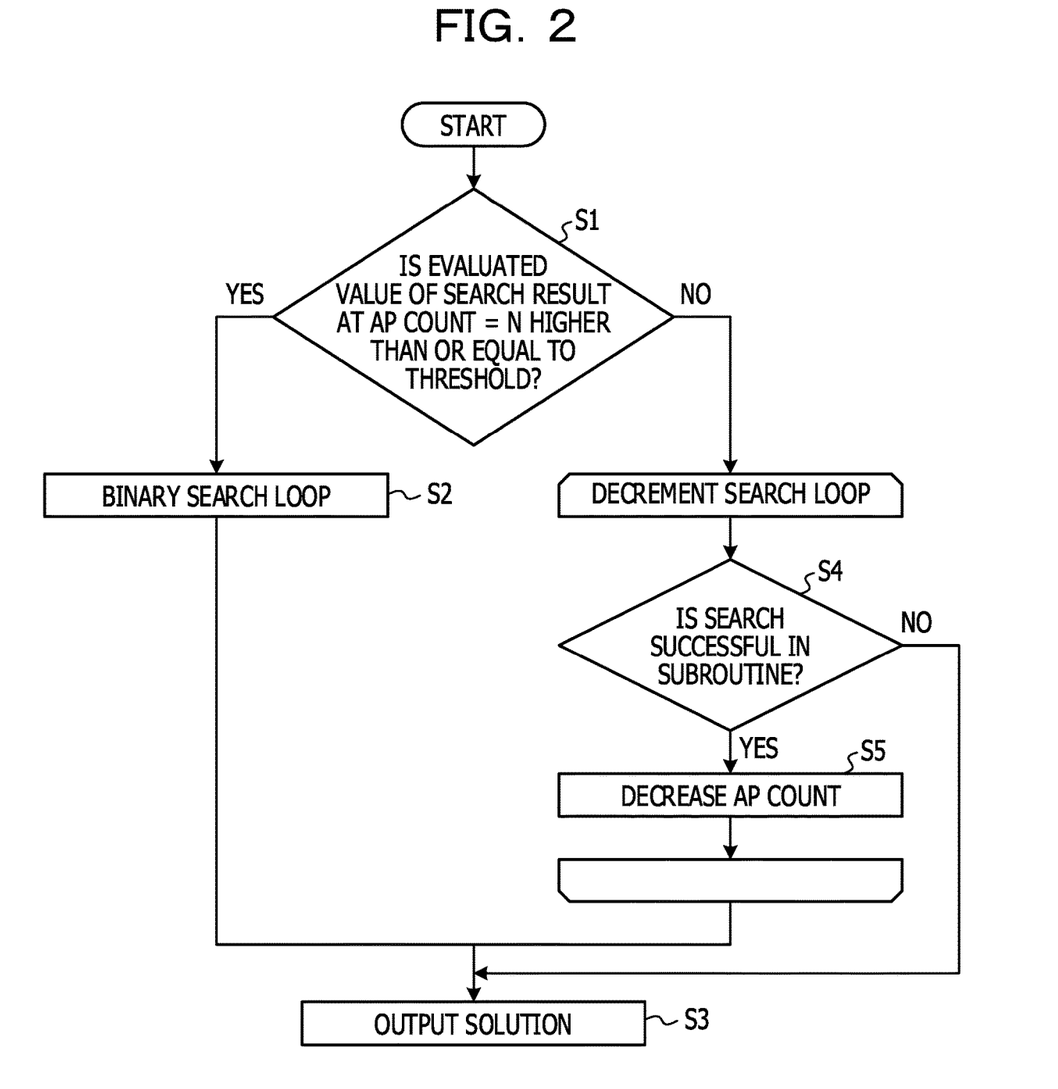
FIG. 2 is a diagram exemplifying a flowchart executed in a case where the information processing apparatus performs an arrangement search for wireless access points.

FIG. 2 is a diagram exemplifying a flowchart executed in a case where the information processing apparatus 100 performs an arrangement search for the wireless access points. With reference to FIG. 1A and FIG. 2, the arrangement search by the information processing apparatus 100 will be described. Before the execution of the flowchart in FIG. 2, it is assumed that the user inputs the initial value of the access points (maximum AP count=N) and the communication requirements such as the coverage rate, the capacity, the throughput, and the communication delay by using the input device 104.

First, the AP count management unit 40 sets the AP count as the maximum AP count N and causes the search unit 60 to perform the search for the optimal arrangement that satisfies the communication requirements. The AP count management unit 40 determines whether or not an evaluated value of the search result is higher than or equal to a threshold (step S1). A technique such as a genetic algorithm or a local search may be used as the search method herein. The evaluated value is not particularly limited as long as the value is an index having a higher value as the search result is more satisfactory, and for example, a throughput or the like may be used. For example, it is determined whether or not the throughput in the searched optimal arrangement is higher than or equal to a threshold (for example, twice as high as a throughput of a computing condition).

In a case where "Yes" is determined in step S1, the first AP count determination unit 20, the AP count management unit 40, the initial arrangement determination unit 50, the search unit 60, and the interim arrangement saving unit 70 execute a binary search loop (step S2).

Figure 3:
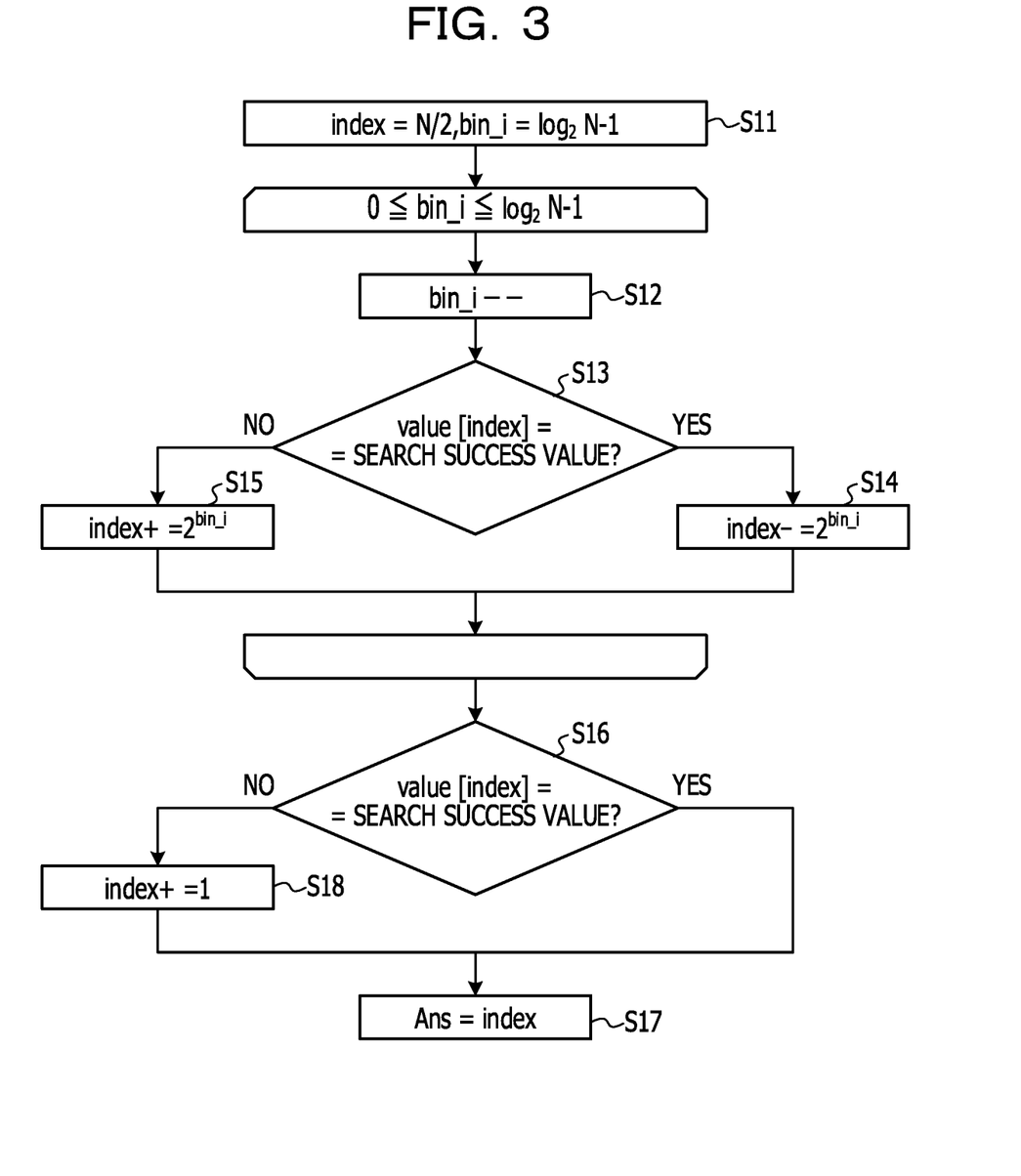
FIG. 3 is a flowchart exemplifying a detail of a binary search loop.

FIG. 3 is a flowchart exemplifying a detail of a binary search loop. As exemplified in FIG. 3, the first AP count determination unit 20 sets the AP count (index) used for the search as N/2 and also sets bin_i=$\log_2$ N−1 (step S11). bin_i is an increment value for determining the AP count to be used for the next search. Therefore, bin_i is a value satisfying 0≤bin_i≤$\log_2$ N−1.

Next, the first AP count determination unit 20 decreases bin_i by "1" (step S12). Next, the initial arrangement determination unit 50 sets index as the AP count and determines an initial arrangement. The search unit 60 searches for an optimal arrangement from the initial arrangement and determines whether or not value [index] representing a search result is a value representing a success (step S13). In a case where "Yes" is determined in step S13, the first AP count determination unit 20 subtracts $2^{bin\_i}$ from index (step S14). The interim arrangement saving unit 70 saves the searched optimal arrangement as an interim arrangement. In a case where "No" is determined in step S13, the first AP count determination unit 20 adds $2^{bin\_i}$ to index (step S15). The subroutine is repeated until the condition of 0≤bin_i≤$\log_2$ N−1 is not satisfied. In the second and subsequent subroutine, the initial arrangement determination unit 50 determines the initial arrangement by using the optimal arrangement saved in the interim arrangement saving unit 70.

Thereafter, the AP count management unit 40 determines whether or not value [index] representing the latest search result is the value representing the success (step S16). In a case where "Yes" is determined in step S16, the AP count management unit 40 sets Ans=index (step S17). In a case where "No" is determined in step S16, the AP count management unit 40 adds 1 to index (step S18) and then executes step S17.

Thereafter, the solution output unit 80 outputs the latest interim arrangement saved in the interim arrangement saving unit 70 as a solution of the optimal arrangement (step S3). In this case, the solution output unit 80 outputs "Ans" as the minimum AP count.

In a case where "No" is determined in step S1, the second AP count determination unit 30, the AP count management unit 40, the initial arrangement determination unit 50, the search unit 60, and the interim arrangement saving unit 70 execute a decrement search loop. Specifically, for example, the initial arrangement determination unit 50 determines the initial arrangement based on the AP count set by the second AP count determination unit 30. The search unit 60 searches for an optimal arrangement from the initial arrangement determined by the initial arrangement determination unit 50 and determines whether or not value [index] representing the search result is the value representing the success (step S4). In the first search in the decrement search loop, the second AP count determination unit 30 sets the AP count as N. In a case where "Yes" is determined in step S4, the second AP count determination unit 30 decreases the AP count by a predetermined number of units (for example, 1) (step S5). The interim arrangement saving unit 70 saves the searched optimal arrangement as an interim arrangement. Thereafter, the search is performed again, and step S4 is executed. In the second and subsequent subroutine, the initial arrangement determination unit 50 determines the initial arrangement by using the optimal arrangement saved in the interim arrangement saving unit 70.

When "No" is determined in step S4, step S3 is executed. In this case, the solution output unit 80 outputs the latest interim arrangement saved in the interim arrangement saving unit 70 as the solution of the optimal interim arrangement. In this case, the solution output unit 80 outputs a value obtained by adding 1 to the current AP count as the minimum AP count. In a case where the AP count becomes zero in step S5, since "No" is determined in step S4, 0+1=1 is output as the solution.

According to the present embodiment, the binary search is performed in a case where the search result at the AP count=the maximum AP count (N) is satisfactory, and the decrement search is performed in a case where the search result at the AP count=N is not satisfactory. In a case where the search result at the AP count=N is satisfactory, a difference between the maximum AP count and the minimum AP count is large. When the decrement search is performed in this case, the computing time becomes very long. Therefore, advantages of the shortening in the computing time when the binary search is performed may be sufficiently attained. On the other hand, when the search result at the AP count=the maximum AP count (N) is not satisfactory, the difference between the maximum AP count and the minimum AP count is small. When the binary search is performed in this case, the low asymptotic accuracy may become an issue. Therefore, advantages of the high asymptotic accuracy when the decrement search is performed may be sufficiently attained. From the above, according to the present embodiment, it is possible to efficiently obtain the arrangement of the requisite minimum access points.

First Modified Example

Figure 4:
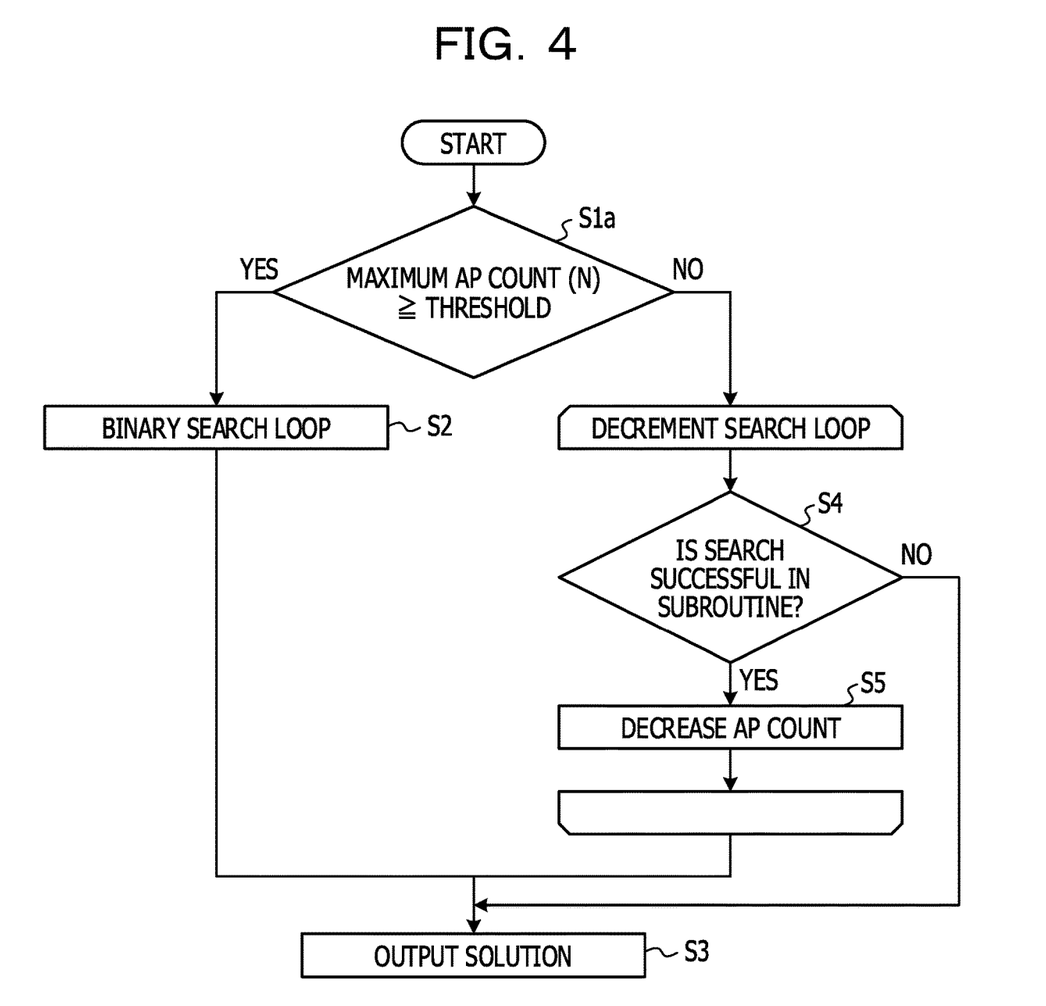
FIG. 4 is a diagram exemplifying another flowchart executed in a case where the information processing apparatus performs the arrangement search for the wireless access points.

According to the first embodiment, a determination reference for whether to use the binary search method or not is to determine whether or not the evaluated value of the search result in a case where the AP count is set as the maximum AP count N is higher than or equal to the threshold but is not limited to this. According to a first modified example, attention is paid to the maximum AP count. FIG. 4 is a diagram exemplifying another flowchart executed in a case where the information processing apparatus 100 performs the arrangement search for the wireless access points. A different point of the processing in FIG. 4 from the processing in FIG. 2 is a point that step S1*a* is executed instead of step S1. In step S1*a*, the AP count management unit 40 determines whether or not the maximum AP count is higher than or equal to a threshold.

According to the present modified example, the binary search is performed in a case where the maximum AP count (N) is high, and the decrement search is performed in a case where the maximum AP count (N) is low. In a case where the maximum AP count (N) is high, the difference between the maximum AP count and the minimum AP count is large. When the decrement search is performed in this case, the computing time becomes very long. Therefore, advantages of the shortening in the computing time when the binary search is performed may be sufficiently attained. On the other hand, in a case where the maximum AP count (N) is low, the difference between the maximum AP count and the minimum AP count is small. When the binary search is performed in this case, the low asymptotic accuracy may become an issue. Therefore, advantages of the high asymptotic accuracy when the decrement search is performed may be sufficiently attained. From the above, according to the present modified example, it is possible to efficiently obtain the arrangement of the requisite minimum access points.

According to the present modified example, when the search is not successful in the decrement search loop or the binary search loop, the interim arrangement is not saved in the interim arrangement saving unit 70. Therefore, since the solution output unit 80 does not output the solution, the user may understand that the solution is not obtained in a range lower than or equal to the maximum AP count.

Second Modified Example

Figure 5:
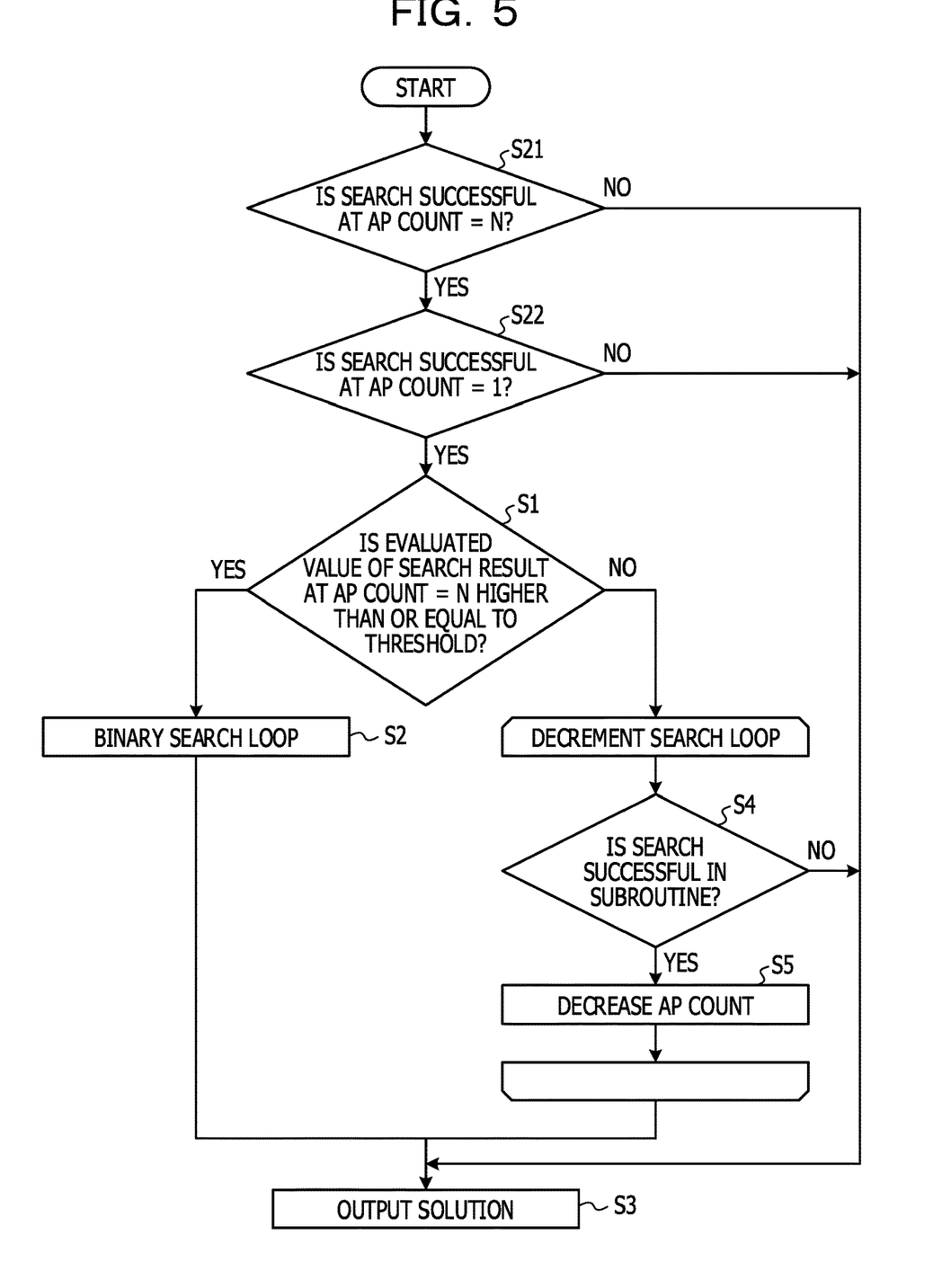
FIG. 5 is a diagram exemplifying another flowchart executed in a case where the information processing apparatus performs the arrangement search for the wireless access points.

According to the first embodiment, processing for avoiding the search processing may be executed before the execution in step S1. FIG. 5 is a diagram exemplifying another flowchart executed in a case where the information processing apparatus 100 performs the arrangement search for the wireless access points. Before the execution in step S1, the AP count management unit 40 sets the AP count as the maximum AP count N and causes the search unit 60 to perform the search for the optimal arrangement that satisfies the communication requirements. The AP count management unit 40 determines whether or not the search by the search unit 60 is successful (step S21). When "No" is determined in step S21, step S3 is executed. In this case, the interim arrangement is not saved in the interim arrangement saving unit 70. Therefore, since the solution output unit 80 does not output the solution, the user may understand that the solution is not obtained in a range lower than or equal to the maximum AP count.

When "Yes" is determined in step S21, the AP count management unit 40 sets the AP count as 1 and causes the search unit 60 to perform the search for the optimal arrangement that satisfies the communication requirements. The AP count management unit 40 determines whether or not the search by the search unit 60 is successful (step S22). When "Yes" is determined in step S22, step S3 is executed. In this case, the search result is saved in the interim arrangement saving unit 70, and the solution output unit 80 outputs the optimal arrangement saved in the interim arrangement saving unit 70 as the solution. The solution output unit 80 also outputs the minimum AP count=1 as the solution. When "No" is determined in step S22, execution from step S1 is performed.

In a case where the search for the optimal arrangement at the maximum AP count is not successful, the minimum AP count is not obtained even when the binary search is performed or the decrement search is performed. According to the present modified example, in a case where the search for the optimal arrangement at the maximum AP count is not successful, both the binary search and the decrement search are not performed, and it is possible to omit unwanted processing.

In a case where the search for the optimal arrangement at the AP count=1 is successful, the AP count=1 is the minimum AP count. According to the present modified example, in a case where the search for the optimal arrangement at the AP count=1 is successful, both the binary search and the decrement search are not performed, and it is possible to omit the unwanted processing.

According to the present modified example, the AP count is set as 1 in step S22 but is not limited to this. For example, a low numeric value higher than or equal to 2 may also be used. This is because, for example, in a facility or the like where the minimum value of the number of access points is determined to be 2 or higher, the number of access points is not necessarily decreased to 1.

The present modified example may also be applied to the first modified example. For example, the processing in step S21 and step S22 may be executed before the execution in step S1*a*.

Third Modified Example

Figure 6:
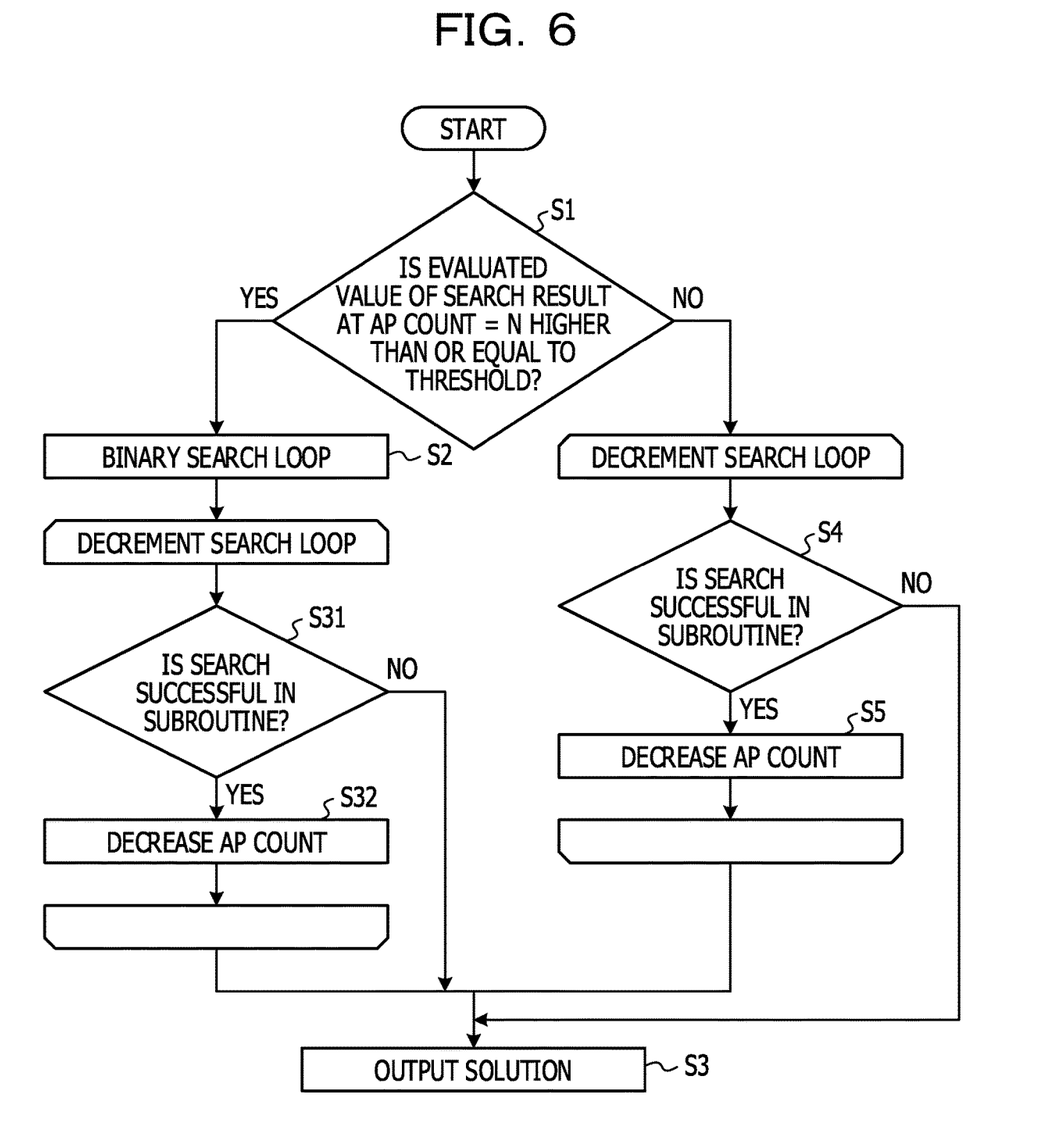
FIG. 6 is a diagram exemplifying another flowchart executed in a case where the information processing apparatus performs the arrangement search for the wireless access points.

According to a third modified example, the decrement search loop is performed after the binary search loop is performed. FIG. 6 is a diagram exemplifying another flowchart executed in a case where the information processing apparatus 100 performs the arrangement search for the wireless access points. A different point from FIG. 2 will be described. The optimal arrangement and the AP count obtained by the execution in step S2 are saved in the interim arrangement saving unit 70.

After the execution in step S2, the second AP count determination unit 30, the AP count management unit 40, the initial arrangement determination unit 50, the search unit 60, and the interim arrangement saving unit 70 execute the decrement search loop. Specifically, for example, the initial arrangement determination unit 50 determines the initial arrangement based on the AP count determined by the second AP count determination unit 30. The search unit 60 searches for the optimal arrangement from the initial arrangement determined by the initial arrangement determination unit 50 and determines whether or not value [index] representing the search result is the value representing the success (step S31). In the first search in the decrement search loop in this case, the initial arrangement determination unit 50 determines the interim arrangement saved in the interim arrangement saving unit 70 as the initial arrangement. The second AP count determination unit 30 uses the AP count saved in the interim arrangement saving unit 70 as the maximum AP count. In a case where "Yes" is determined in step S31, the second AP count determination unit 30 decreases the AP count by the predetermined number of units (for example, 1) (step S32). Thereafter, the search is performed again, and step S31 is executed. In the second and subsequent subroutine, the initial arrangement determination unit 50 determines the initial arrangement by using the optimal arrangement saved in the interim arrangement saving unit 70.

When "No" is determined in step S31, step S3 is executed. In this case, the solution output unit 80 outputs the interim arrangement saved in the interim arrangement saving unit 70 as the solution of the optimal arrangement. In this case, the solution output unit 80 outputs a value obtained by adding 1 to the current AP count as the minimum AP count. In a case where the AP count becomes zero in step S32, since "No" is determined in step S31, 0+1=1 is output as the solution.

Figure 7:
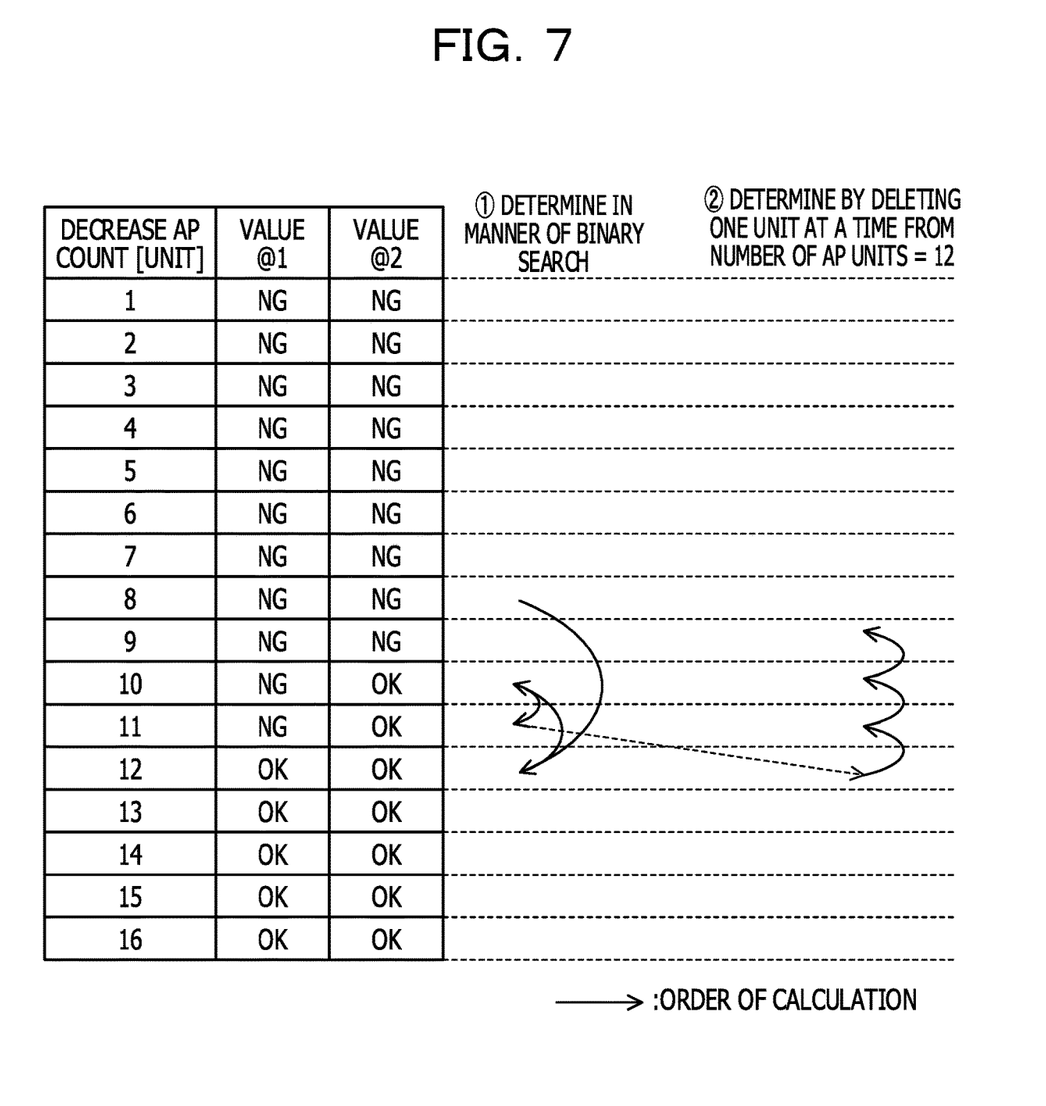
FIG. 7 is a diagram exemplifying a search result of the binary search loop and a decrement search result after the binary search loop.

FIG. 7 is a diagram exemplifying a search result of the binary search loop and a decrement search result after the binary search loop. As exemplified in FIG. 7, the AP count=12 is obtained as the minimum AP count as the search result of the binary search loop. In FIG. 7, a field "value@1" represents the search result of the binary search loop. As described above, the asymptotic accuracy is not necessarily high in the binary search.

In view of the above, the decrement search is further performed, and the requisite minimum AP count may be further decreased. In FIG. 7, a field "value@2" represents the search result of the decrement search loop after the binary search loop. In the example of FIG. 7, the AP count=12 may be decreased to 10 as the AP count. When the AP count is not decreased even after the decrement search is performed, the requisite minimum AP count is obtained at a sufficient accuracy in the binary search.

According to the present modified example, since the calculation order (the maximum number of searches) is only $\log_2 N + \alpha$, the computing time may be further shortened than the computing time when the calculation order (the maximum number of searches=N) in a case where only the decrement search is performed. On the other hand, the asymptotic accuracy may be increased as compared with a case where only the binary search is performed.

TABLE 2

| SEARCH METHOD | THE NUMBER OF COMPUTATIONS | ASYMPTOTIC ACCURACY TO OPTIMAL ARRANGEMENT |
|---|---|---|
| BINARY SEARCH | FEW | INTERMEDIATE |
| DECREMENT SEARCH | MANY | VERY HIGH |
| PRESENT MODIFIED EXAMPLE | FEW | HIGH |

Figure 8:
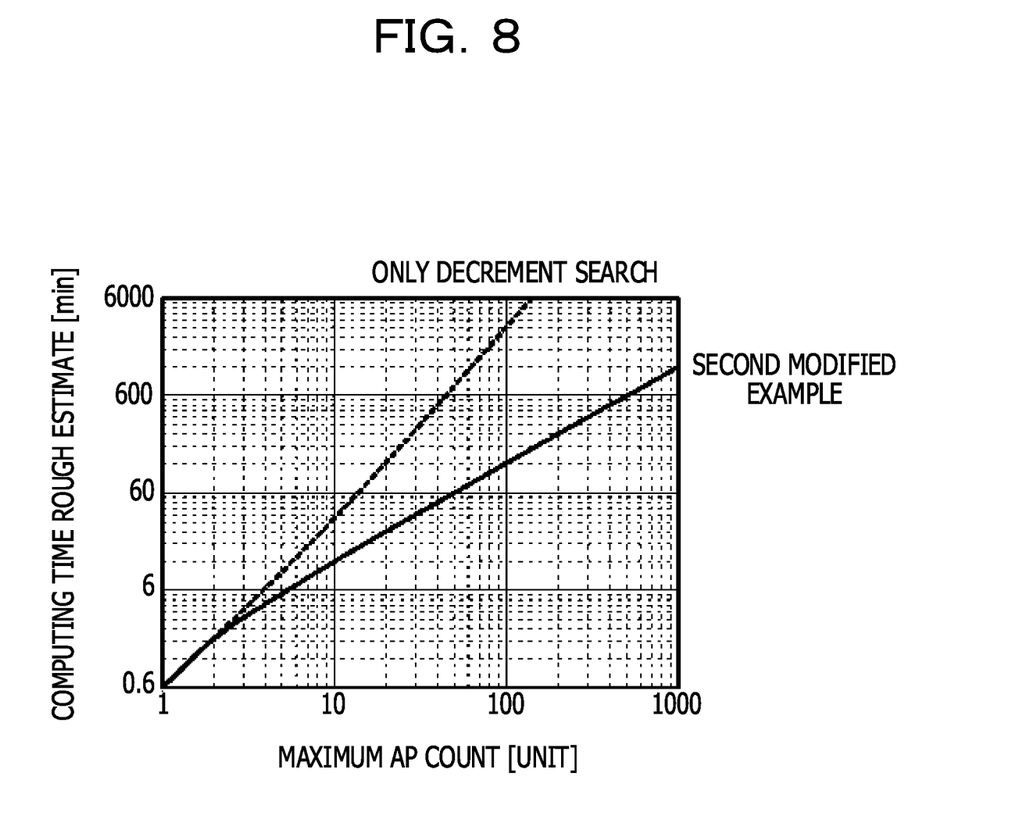
FIG. 8 is a diagram exemplifying a computing time in a case where a minimum AP count is searched for by using a second modified example.

FIG. 8 is a diagram exemplifying a computing time in a case where a minimum AP count is searched for by using a second modified example. FIG. 8 also exemplifies the computing time in a case where only the decrement search is performed. As exemplified in FIG. 8, as the maximum AP count is increased, the computing time tends to be much longer when only the decrement search is performed. On the other hand, according to the second modified example, since the binary search is performed, the computing time may be suppressed. For example, in the case of the maximum AP count=100, the computing time is two days when only the decrement search is performed, but according to the second modified example, the computing time is shortened to approximately two hours.

With regard to the above-mentioned respective examples, the AP count management unit 40 functions as an example of a determination unit configured to determine whether to use the binary search method or not to determine the number of wireless access points by using a predetermined reference. The search unit 60 functions as an example of a search unit configured to search for the minimum number of access points satisfying the communication requirements in the binary search loop in a case where it is determined that the binary search method is used and search for the minimum number of access points satisfying the communication requirements by decreasing the number of access points by the predetermined number of units at a time in a case where it is not determined that the binary search method is used to search for the arrangement of the wireless access points with respect to the searched minimum number of access points.

Although the embodiment of the present disclosure has been described above in detail, the embodiment is not limited and may be variously modified and changed within the gist of the disclosure described in the scope of claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
   a memory;
   circuitry coupled to the memory, the circuitry configured to:
   determine whether or not a binary search method is used by using a predetermined reference to determine the number of wireless access points; and
   search for a minimum number of access points satisfying communication requirements in a binary search loop in a case where it is determined that the binary search method is used and search for the minimum number of access points satisfying the communication requirements by decreasing the number of access points by a predetermined number of units at a time in a case where it is not determined that the binary search method is used to search for an arrangement of the wireless access points with respect to the searched minimum number of access points.

2. The information processing apparatus according to claim 1, wherein
   the predetermined reference is whether or not an evaluated value of the arrangement computed in a case where the number of access points is set as a maximum number of access points is higher than or equal to a threshold.

3. The information processing apparatus according to claim 1, wherein
   the predetermined reference is whether or not a maximum number of access points is higher than or equal to a threshold.

4. The information processing apparatus according to claim 1, wherein
   processing for searching for the minimum number of access points is not performed in a case where an arrangement searched for when the number of access points is set as a maximum number of access points does not satisfy the communication requirements.

5. The information processing apparatus according to claim 1, wherein processing for searching for the minimum number of access points is not performed in a case where an arrangement searched for when the number of access points is set as a predetermined number lower than a maximum number of access points satisfies the communication requirements.

6. The information processing apparatus according to claim 1, wherein processing for searching for the minimum number of access points includes searching for the minimum number of access points satisfying the communication requirements by decreasing the number of access points by a predetermined number of units at a time while the minimum number of access points obtained in the binary search loop is set as a maximum value.

7. An arrangement computing method for wireless access points, the arrangement computing method comprising:

determining whether or not a binary search method is used by using a predetermined reference to determine the number of wireless access points; and searching for a minimum number of access points satisfying communication requirements in a binary search loop in a case where it is determined that the binary search method is used and searching for the minimum number of access points satisfying the communication requirements by decreasing the number of access points by a predetermined number of units at a time in a case where it is not determined that the binary search method is used to search for an arrangement of the wireless access points with respect to the searched minimum number of access points.

8. The arrangement computing method according to claim 7, wherein the predetermined reference is whether or not an evaluated value of the arrangement computed in a case where the number of access points is set as a maximum number of access points is higher than or equal to a threshold.

9. The arrangement computing method according to claim 7, wherein the predetermined reference is whether or not a maximum number of access points is higher than or equal to a threshold.

10. The arrangement computing method according to claim 7, wherein processing for searching for the minimum number of access points is not performed in a case where an arrangement searched for when the number of access points is set as a maximum number of access points does not satisfy the communication requirements.

11. The arrangement computing method according to claim 7, wherein processing for searching for the minimum number of access points is not performed in a case where an arrangement searched for when the number of access points is set as a predetermined number lower than a maximum number of access points satisfies the communication requirements.

12. The arrangement computing method according to claim 7, wherein processing for searching for the minimum number of access points includes searching for the minimum number of access points satisfying the communication requirements by decreasing the number of access points by a predetermined number of units at a time while the minimum number of access points obtained in the binary search loop is set as a maximum value.

13. A non-transitory computer-readable storage medium storing a program that causes a processor included in a computer to execute a process, the process comprising:

a process for determining whether or not a binary search method is used by using a predetermined reference to determine the number of wireless access points; and a process for searching for a minimum number of access points satisfying communication requirements in a binary search loop in a case where it is determined that the binary search method is used and searching for the minimum number of access points satisfying the communication requirements by decreasing the number of access points by a predetermined number of units at a time in a case where it is not determined that the binary search method is used to search for an arrangement of the wireless access points with respect to the searched minimum number of access points.

* * * * *